United States Patent [19]
Perronnet et al.

[11] 3,905,996
[45] Sept. 16, 1975

[54] IMIDAZOLIDONES

[75] Inventors: Jacques Perronnet; André Teche, both of Paris, France

[73] Assignee: Roussel-UCLAF, Paris, France

[22] Filed: July 31, 1973

[21] Appl. No.: 384,197

[30] Foreign Application Priority Data
Aug. 4, 1972 France .............................. 72.28191

[52] U.S. Cl. ............ 260/309.7; 71/92; 260/239.3 R; 260/251 R
[51] Int. Cl.² ........................................ C07D 233/02
[58] Field of Search ................................. 260/309.7

[56] References Cited
UNITED STATES PATENTS
2,985,663   5/1961   Carmack et al. ................ 260/309.7

OTHER PUBLICATIONS
Schuler, Chemical Abstracts, Vol. 68, (1968), 11898d.

*Primary Examiner*—Richard L. Raymond
*Attorney, Agent, or Firm*—Hammond & Littell

[57] ABSTRACT

Novel compounds of the formula

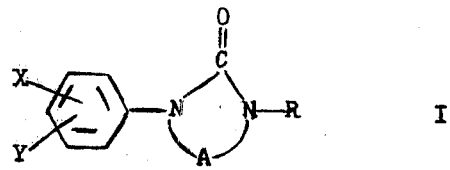

wherein A is a straight or branched chain alkylene of 2 to 6 carbon atoms, X is selected from the group consisting of hydrogen, halogen, $-CF_3$, $-NO_2$, acyl of an organic carboxylic acid of 1 to 6 carbon atoms, alkyl and alkoxy of 1 to 6 carbon atoms and alkenyloxy of 2 to 6 carbon atoms optionally substituted with halogen, Y is selected from the group consisting of hydrogen, halogen and alkyl and alkoxy of 1 to 6 carbon atoms and R is selected from the group consisting of alkoxy of 1 to 4 carbon atoms, alkoxycarbonyl of 2 to 6 carbon atoms and chloroacetyl which have herbicidal properties.

5 Claims, No Drawings

IMIDAZOLIDONES

STATE OF THE ART

Cyclic compounds containing a

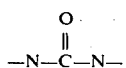

group are described in French Patent No. 1,494,338, British Patent No. 1,016,826 and Swiss Patent No. 430,324 which are useful as herbicides but they do not have the structure of formula I.

OBJECTS OF THE INVENTION

It is an object of the invention to provide the novel cyclic compounds of formula I.

It is another object of the invention to provide a novel process for the preparation of the compounds of formula I.

It is a further object of the invention to provide novel herbicidal compositions and to a novel method of killing plants.

These and other objects and advantages of the invention will become obvious from the following detailed description.

THE INVENTION

The novel cyclic compounds of the invention have the formula

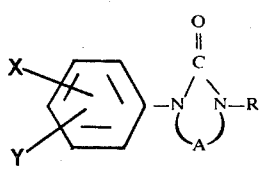

wherein A is a straight or branched chain alkylene of 2 to 6 carbon atoms, X is selected from the group consisting of hydrogen, halogen, —CF$_3$, —NO$_2$, acyl of an organic carboxylic acid of 1 to 6 carbon atoms, alkyl and alkoxy of 1 to 6 carbon atoms and alkenyloxy of 2 to 6 carbon atoms optionally substituted with halogen, Y is selected from the group consisting of hydrogen, halogen and alkyl and alkoxy of 1 to 6 carbon atoms and R is selected from the group consisting of alkoxy of 1 to 4 carbon atoms, alkoxycarbonyl of 2 to 6 carbon atoms and chloroacetyl.

Among the preferred compounds of formula I are 1-(3',4'-dichlorophenyl)-2-oxo-3-methoxy-hexahydropyrimidine, 1-(3',4'-dichlorophenyl)-3-methoxy-2-imidazolidone, 1-(4'-isopropylphenyl)-3-methoxy-2-imidazolidone, 1-(3'-chlorophenyl)-3-methoxy-2-imidazolidone and 1-(3',6'-dichlorophenyl)-3-methoxy-2-imidazolidone.

The novel process of the invention for the preparation of cyclic compounds of formula I wherein R is alkoxy of 1 to 4 carbon atoms comprises reacting in the presence of a basic agent a compound of the formula Hal—A—Z wherein Hal is halogen, A has the above definition and Z is selected from the group consisting of hydroxy and halogen with a substituted urea of the formula

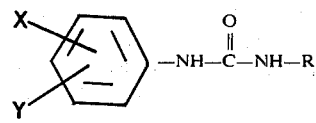

wherein X and Y have the above definitions and R is alkoxy of 1 to 4 carbon atoms to form the corresponding cyclic compound of formula I.

The basic agent in whose presence the condensation is effected is preferably an alkali metal hydride or alkali metal amide and the reaction is advantageously conducted in an organic solvent such as dimethylformamide or dimethylsulfoxide. The Hal—A—OH compound can be prepared in situ with reaction of a basic agent such as an alkali metal carbonate with a Hal—A—Hal' compound with Hal and Hal' preferably being chlorine or bromine.

The preparation of compounds of formula I in which R is alkoxy of 1 to 4 carbon atoms may also be effected by condensing an isocyanate of the formula

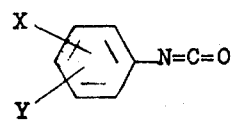

with a N-alkoxy-N-hydroxyalkylamine of the formula

wherein X, Y and A have the above definitions and R is alkoxy to obtain a compound of the formula

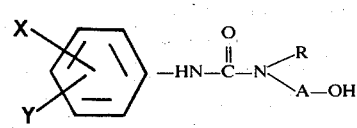

reacting the latter with a chlorination agent to obtain a compound of the formula

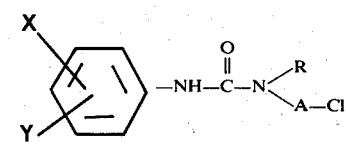

and reacting the latter with a basic agent to form the corresponding compound of formula I.

The isocyanate condensation is preferably effected in an organic solvent such as isopropyl ether or tetrahydrofuran. As a result of this condensation, there is formed besides the compound of formula V a urethane of the formula

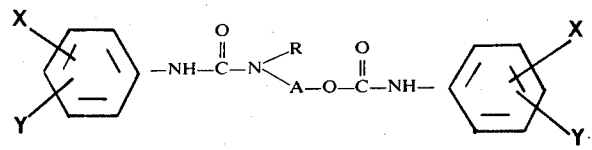

which can be separated by chromatography, for example.

The chlorination agent is preferably thionyl chloride, sulfuryl chloride or oxalyl chloride but bromination agents or alkylsulfonyl halide or arylsulfonyl halides may also be used. The basic agent for the last condensation step is preferably an alkali metal hydroxide and the step is preferably effected in a lower alkanol in the presence of water.

The compounds of formula I wherein R is alkoxycarbonyl or chloroacetyl may be prepared by reacting a compound of the formula

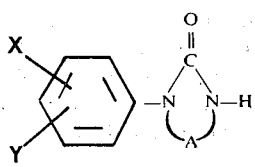

VII wherein A, X and Y have the above definition in the presence of a basic agent with a compound of the formula Hal—R wherein Hal is chlorine or bromine and R is chloroacetyl or alkoxycarbonyl to obtain the corresponding compound of formula I.

The basic agent is preferably an alkali metal hydride or an alkali metal amide and the condensation is preferably effected in an organic solvent such as dimethylformamide.

The novel herbicidal compositions are comprised of an herbicidally effective amount of at least one compound of formula I and a carrier. The compositions may also contain one or more other pesticides or products which influence the growth of plants.

The compositions may be in the form of powders, granules, suspensions, emulsions or solutions optionally containing besides the active ingredients, cationic, anionic or nonionic surface-active agents, inert powders such as talc, silicates, clays or kieselguhr, a vehicle such as water, alcohols, hydrocarbon or other organic solvents, mineral, animal or vegetable oils, etc.

An example of a herbicidal composition in the form of a wettable powder comprises 25% by weight of 1-(3',4'-dichlorophenyl)-3-methoxy-2-imidazolidone, 15% by weight of Ekapersol S (condensation product of sodium naphthalene sulfonate) 0.5% by weight of Brecolane N.V.A. (sodium alkylnaphthalene sulfonate), 34.5% by weight of Zeosil 39 (precipitated synthetic hydrated silica) and 25% by weight of Vercoryl S (colloidal kaolin). The preferred compositions contain 10 to 80% of the compounds of formula I.

The novel method of killing plants comprises contacting the plants either pre-emergence or post-emergence with an herbicidally effective amount of at least one compound of formula I. The usual effective amount is 0,625 to 5 kg/ha depending upon the method of application and the specific compound.

The substituted ureas of formula II used as the starting materials may be prepared by reacting O-alkylhydroxylamine with an isocyanate of the formula

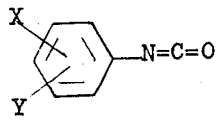

wherein X and Y have the above definition. N-methoxy-N'-(3',4'-dichlorophenyl)-urea has been described by Scherer et al., Angew. Chem., Vol. 75 (18) (1963),p. 851. 1-(3',4'-dichlorophenyl)-2-imidazolidone has been described by Najer, Bull. Soc. Chim., (1963), p. 323.

The N-alkoxy-N-hydroxyalkylamines of formula IV can be prepared by reacting a O-alkylhydroxylamine with an ω-hydroxyalkylhalide.

In the following examples there are described several preferred embodiments to illustrate the invention. However, it should be understood that the invention is not intended to be limited to the specific embodiments.

EXAMPLE 1

1-(3',4'-dichlorophenyl)-3-methoxy-2-imidazolidone 20 g of a 50% suspension of sodium hydride in vaseline oil and then 50 g of 2-bromoethanol were added to 94 g of N-methoxy-N'-(3,4-dichlorophenyl)-urea [described by Scherer et al, Angew. Chem., Vol. 75(18)(1963),p. 851] in 400 ml of dimethylformamide and the reaction mixture was held for 5 hours at 100°C. The mixture was then poured into water and the mixture was extracted with ethyl acetate. The organic extracts were dried over sodium sulfate and then were distilled to dryness under reduced pressure. The residue was added to isopropyl ether and the precipitate was recovered by vacuum filtration and was crystallized from ethyl acetate to obtain 25 g of 1-(3',4'-dichlorophenyl)-3-methoxy-2-imidazolidone melting at 123°C.

Analysis: $C_{10}H_{10}Cl_2N_2O_2$; molecular weight = 261.108: Calculated: %C, 46.00; %H, 3.86: %Cl, 27.15; %N, 10.73. Found: %C, 45.9; %H, 3.9, %cl, 27.1; %N, 10.5.

EXAMPLE 2

1-(3',4'-dichlorophenyl)-3-methoxy-2-imidazolidone 17.8 g of 1-chloro-2-bromo-ethane were added with stirring to a suspension of 2.5 g of N-methoxy-N'-(3,4-dichlorophenyl)-urea and 11 g of potassium carbonate in 50 ml of dimethylsulfoxide and the mixture was stirred for 3½ hours. Methylene chloride was added thereto and the mixture was stirred. The methylene chloride phase was washed with water, was dried and distilled to dryness under reduced pressure. The residue was added to ether and the crystals formed were recovered by vacuum filtration and crystallized from ethyl acetate to obtain 1.4 g of 1-(3',4'-dichlorophenyl)-3-methoxy-2-imidazolidone melting at 123°C. The product was identical to that of Example 1.

EXAMPLE 3

1-(3',4'-dichlorophenyl)-3-methoxy-2-imidazolidone 100 g of potassium carbonate were added to a mixture of 20 g of N-methoxy-N'-(3,4-dichlorophenyl)-urea in 120 ml of dimethylsulfoxide and the mixture was stirred for 15 minutes. 20 g of 1,2-dichloroethane were added thereto and the mixture was stirred at room temperature for 24 hours and was then poured into a water-ice mixture. The mixture was stirred for 2 hours and was then vacuum filtered. The precipitate was washed with water and dried to obtain 22 g of 1-(3',4'-dichlorophenyl)-3-methoxy-2-imidazolidone melting at 123°C. The product was identical to that of Examples 1 and 2.

EXAMPLE 4

1-(3'-trifluoromethylphenyl)-3-methoxy-2-imidazolidone

STEP A: N-(3-trifluoromethylphenyl)-N'-methoxy-urea 30 g of 3-trifluoromethylphenyl isocyanate [described by Kaplan, J. Chem. Eng. Data, Vol. 6 (1961), p. 272] were added to 300 ml of tetrahydrofuran and then a solution of 8.28 g of O-methylhydroxylamine in 100 ml of tetrahydrofuran was added thereto. The mixture was stirred for 16 hours and was concentrated to dryness under reduced pressure to obtain 38 g of N-(3-trifluoromethylphenyl)-N'-methoxy-urea melting at 135°C. Crystallization of a sample from ethanol gave a product with a melting point of 137°C.

STEP B: 1-(3'-trifluoromethylphenyl)-3-methoxy-2-imidazolidone 145 g of potassium carbonate and then 225 g of 1-chloro-2-bromo-ethane were added to a mixture of 31 g of N-(3-trifluoromethylphenyl)-N'-methoxy-urea in 300 ml of dimethylsulfoxide and the mixture was stirred for 3½ hours. Methylene chloride was added thereto and the methylene chloride phase was washed with water, was dried and concentrated to dryness under reduced pressure. The residue was crystallized from a mixture of isopropyl ether and petroleum ether (boiling point of 65°–75°C) to obtain 30 g of 1-(3'-trifluoromethylphenyl)-3-methoxy-2-imidazolidone melting at 65°C.

Analysis: $C_{11}H_{11}F_3N_2O_2$; molecular weight = 260.22: Calculated: %C, 50.77; %H, 4.26; %F, 21.90; %N, 10.77. Found: %C, 50.8; %H, 4.3; %F, 22.2; %N, 10.9.

EXAMPLE 5

1-(4'-bromophenyl)-3-methoxy-2-imidazolidone

Step A: N-methoxy-N-(2-hydroxyethyl)-amine 303 g of triethylamine were added to a solution of 141 g of methoxyamine in 1200 ml of tetrahydrofuran and then 366 g of 2-bromoethanol were added thereto with stirring. The mixture was refluxed for 16 hours and after cooling, the mixture was vacuum filtered to remove the triethylamine hydrochloride formed. The filtrate was evaporated to dryness under reduced pressure and the oil residue was rectified under reduced pressure to obtain 122 g of N-methoxy-N-(2-hydroxyethyl)-amine boiling at 45°C at 3 mm Hg.

Step B: N'-methoxy-N'-(2-hydroxyethyl)-N-(4-bromophenyl)-urea

A solution of 76 g of p-bromophenyl isocyanate in 400 ml of isopropyl ether was slowly added to 38 g of N-methoxy-N-(2-hydroxyethyl)-amine in 200 ml of isopropyl ether and the mixture was stirred for 16 hours and then was evaporated to dryness under reduced pressure. The residue was chromatographed over silica gel and was eluted with a (1-1-1) mixture of benzene, chloroform and acetone to obtain 19 g of raw N'-methoxy-N'-(2-hydroxyethyl)-N-(4-bromophenyl)-urea melting at 116°C which was used as is for the next step. The chromatography provided by other means 2-[N'-(N'-methoxy-N''-4-bromophenyl)-ureido]-N-(4-bromophenyl)-urethane.

Step C: N'-methoxy-N'-(2-chloroethyl)-N-(4-bromophenyl)-urea 19 g of N'-methoxy-N'-(2-hydroxyethyl)-N-(4-bromophenyl)-urea were added to 150 ml of benzene followed by 8.7 g of thionyl chloride and the mixture was stirred for 3 hours. The mixture was evaporated to dryness under reduced pressure to obtain 20.5 g of N'-methoxy-N'-(2-chloroethyl)-N-(4-bromophenyl)-urea.

I.R. Spectrum: Presence of NH at $3424^{cm-1}$, of C=O at $1694^{cm-1}$ and of aromatic ring at 1587, 1515 and $1492^{cm-1}$.

Step D: 1-(4'-bromophenyl)-3-methoxy-2-imidazolidone

A mixture of 100 ml of ethanol and 4.7 ml of an aqueous 85% potassium hydroxide solution were added to 18.5 g of N'-methoxy-N'-(2-chloroethyl)-N-(4-bromophenyl)-urea and the mixture was stirred for 16 hours and then was poured into water. The mixture was extracted with ethyl acetate and the organic extracts were washed with water, dried and concentrated to dryness under reduced pressure. The residue was crystallized from ethanol to obtain 10 g of 1-(4'-bromophenyl)-3-methoxy-2-imidazolidone melting at 123°C.

Analysis: $C_{10}H_{11}BrN_2O_2$; molecular weight = 271.12: Calculated: %C, 44.30; %H, 4.09; %Br, 29.48; %N, 10.34. Found: %C, 44.4; %H, 4.1; %Br, 29.8; %N, 10.3.

EXAMPLE 6

1-[4'-(3''-chloro-2''-propenyloxy)-phenyl]-3-methoxy-2-imidazolidone

Step A: N-methoxy-N-(2-hydroxyethyl)-N'-[p-(3-chloro-2-propenyloxy)-phenyl]-urea 36.4 g of N-methoxy-2-hydroxyethylamine were added to 250 ml of isopropyl ether and then 83.6 g of p-(3-chloro-2-propenyloxy)-phenyl isocyanate [prepared by method of Belgium Patent No. 744,551] were added dropwise thereto over a period of about 30 minutes. The mixture was stirred for 16 hours and the isopropyl ether was removed by decantation to obtain the semi-crystalline residue product which was purified by chromatography over silica gel and was eluted with ethyl acetate to obtain 20 g of N-methoxy-N-(2-hydroxyethyl)-N'-[p-(3-chloro-2-propenyloxy)-phenyl]-urea melting at 68°C.

Step B: N-methoxy-N-(2-chloroethyl)-N'-[p-(3-chloro-2-propenyloxy)-phenyl]-urea 13.2 g of thionyl chloride were added to 34.4 g of N-methoxy-N-(2-hydroxyethyl-N'-[p-(3-chloro-2-propenyloxy)phenyl]-urea in 250 ml of benzene and the mixture was stirred for 3 hours and concentrated to dryness under reduced pressure to obtain 40 g of N-methoxy-N-(2-chloroethyl)-N'-[p-(3-chloro-2-propenyloxy)-phenyl]-urea.

I.R. Spectrum: Absorption at $3424^{cm-1}$ characteristic of NH, absorption at $1677^{cm-1}$ characteristics of C=O, absorption of 1638, 1618, 1598 and $1520^{cm-1}$ characteristic of aromatic ring and ethylenic bonding.

Step C: 1-[4'-(3''-chloro-2''-propenyloxy)-phenyl]-3-methoxy-2-imidazolidone 40 g of N-methoxy-N-(2-chloroethyl)-N'-[p-(3-chloro-2-propenyloxy)-phenyl]-urea were added to 8.2 ml of an aqueous solution of 85% potassium hydroxide in 200 ml of ethanol and the mixture was stirred for 5 hours and then was concentrated to dryness under reduced pressure. The residue was added to water and the precipitate formed was recovered by vacuum filtration. The product was dissolved in ethyl acetate and the organic solution was dried and concentrated to dryness under reduced pressure. The residue was crystallized from a benzene-ether mixture to obtain 19 g of 1-[4'-(3''-chloro-2''-propenyloxy)-phenyl]-3-methoxy-2-imidazolidone melting at 88°C. The product was a mixture of 55% of the E isomer and 45% of the Z isomer.

I.R. Spectrum: Presence of C=at $1734^{cm-1}$, of C=C at 1654, $1636^{cm-1}$ and of aromatic at 1588 and $1514^{cm-1}$.

EXAMPLE 7

1-(3',4'-dichlorophenyl)-3-carbethoxy-2-imidazolidone 5 g of a 50% sodium hydride suspension in vaseline oil were added in small fractions to 23.1 g of 1-(3',4'-dichlorophenyl)-2-imidazolidone [described by Najer, Bull. Soc. Chim., (1963), p. 323] in 350 ml of dimethylformamide and the mixture was stirred for 1 hour. A solution of 15 g of ethyl chloroformate in 100 ml of dimethylformamide was added dropwise to the mixture which was then stirred for 2 hours and poured into water. The precipitate formed was recovered by vacuum filtration and was crystallized from acetone to obtain 13 g of 1-(3',4'-dichlorophenyl)-3-carbethoxy-2-imidazolidone melting at 173°C.

Analysis: $C_{12}H_{12}N_2Cl_2O_3$; molecular weight = 303.147: Calculated: %C, 47.54; %H, 3.98; %Cl, 23.39, %N, 9.25. Found: %C, 47.6; %H, 4.0; %Cl 23.4; %N, 9.6.

EXAMPLE 8

1-(3',4'-dichlorophenyl)-2-oxo-3-methoxyhexahydropyrimidine

Step A: N-methoxy-N-(3-chloropropyl)-N'-(3,4-dichlorophenyl)-urea 292 g of 1-bromo-3-chloro-propane were added to a mixture of 170 g of calcined potassium carbonate and 36.3 g of N-methoxy-N'-(3,4-dichlorophenyl)-urea [described by Scherer et al., Angeu. Chem., Vol. 75(18) (1963), p. 851] in 350 ml of dimethylsulfoxide and the mixture was stirred for 4 hours. Methylene chloride was added thereto and the mixture was washed with water, dried and concentrated to dryness under reduced pressure. The residue was added to ether and the precipitate formed was recovered by vacuum filtration and was crystallized from isopropyl ether to obtain 24.8 g of N-methoxy-N-(3-chloropropyl)-N'-(3,4-dichlorophenyl)-urea melting at 88°C.

Analysis: $C_{11}H_{13}Cl_3N_2O_2$; molecular weight = 311.601: Calculated: %C, 42.40; %H, 4.20; %N, 8.99; %Cl, 34.14. Found: %C, 42.5; %H, 4.3; %N, 9.0; %Cl, 34.4.

Step B: 1-(3',4'-dichlorophenyl)-2-oxo-3-methoxyhexahydropyrimidine

A solution of 5.6 g of sodium methylate in 100 ml of ethanol was added to a solution of 28.6 g of N-methoxy-N-(3-chloropropyl)-N'-(3,4-dichlorophenyl)-urea in 300 ml of ethanol and the reaction mixture was refluxed for 1 hour. The mixture was then stirred at room temperature for 16 hours and was concentrated to dryness under reduced pressure. The residue was added to water and the aqueous solution was acidified to a pH of 4 with aqueous 2 N hydrochloric acid solution. The solution was extracted with ethyl acetate and the organic phase was washed with a saturated aqueous sodium bicarbonate solution and then with water and was dried and concentrated to dryness under reduced pressure. The residue was taken up in ispropyl ether and the precipitate formed was recovered by vacuum filtration to obtain 14.5 g of 1-(3',4'-dichlorophenyl)-2-oxo-3-methoxyhexahydropyrimidine melting at 84°C. A sample crystallized from isopropyl ether melted at 84°C.

Analysis: $C_{11}H_{12}Cl_2N_2O_2$; molecular weight = 275.136: Calculated: %C, 48.02; %H, 4.40; %Cl, 25.78; %N, 10.18. Found: %C, 48.2; %H, 4.5; %Cl, 25.5; %N, 10.0.

The said product could also be prepared by the procedures of Examples 1, 2 and 3.

EXAMPLE 9

1-(3',4'-dichlorophenyl)-3-chloroacetyl-2-imidazolidone 5 g of a 50% suspension of sodium hydride in vaseline oil were added in small fractions to a solution of 23.1 g of 1-(3',4'-dichlorophenyl)-2-imidazolidone in 350 ml of dimethylformamide and the mixture was stirred for 1 hour. A solution of 15 g of monochloroacetyl chloride in 100 ml of dimethylformamide was dropwise to the mixture and the mixture was stirred for 16 hours. The mixture was poured into water and the precipitate formed was recovered by vacuum filtration and was crystallized from dimethylformamide to obtain 15 g of 1-(3',4'-dichlorophenyl)-3-chloroacetyl-2-imidazolidone melting at 212°C.

Analysis: $C_{11}H_9Cl_3N_2O_2$; molecular weight = 307.56: Calculated: %C 42.95; %H, 2.95; %Cl, 34.59; %N, 9.12. Found: %C, 43.2; %H, 3.0; %Cl, 34.3; %N, 9.5.

EXAMPLE 10

1-[3'-(3''-chloroallyloxy)-phenyl]-3-methoxy-2-imidazolidone

Step A: N-methoxy-N'-(3-chloroallyloxy-phenyl)-urea 75.3 g of m-chloroallyloxy-phenyl isocyanate [prepared by method of Belgium patent No. 744,551] and then a solution of 17 g of O-methylhydroxylamine in 50 ml of isopropylether were added to 200 ml of isopropylether and the mixture was stirred for 4 hours. The precipitate formed was recovered by vacuum filtration, was washed and dried to obtain 67.8 g of N-methoxy-N'-(3-chloroallyloxy-phenyl)-urea melting at 70°C.

Step B: 1-[3'-(3''-chloroallyloxy)phenyl]-3-methoxy-2-imidazolidone 110 g of potassium carbonate and 150 g of 1-bromo-2-chloro-ethane were added to 25.6 g of N-methoxy-N'-(3-chloroallyloxyphenyl)-urea in 300 ml of dimethylsulfoxide and the mixture was stirred for 17 hours. The mixture was poured into water and was extracted with methylene chloride. The organic phase was washed with water, was dried and was concentrated to dryness. The residue was crystallized from isopropyl ether and the precipitate formed was recovered by vacuum filtration and dried to obtain 17.3 g of 1-[3'-(3''-chloroallyloxyphenyl)]-3-methoxy-2-imidazolidone melting at 71°C.

Analysis: $C_{13}H_{15}ClN_2O_3$; molecular weight = 282.73: Calculated: %C, 55.22; %H, 5.35; %Cl, 12.54; %N, 9.91. Found: %C, 55.1, %H, 5.4; %Cl, 12.5; %N, 9.9.

EXAMPLE 11

1-(4'-isopropylphenyl)-3-methoxy-2-imidazolidone

Step A: p-isopropylphenyl isocyanate

A solution of 50 g of p-isopropylaniline in 200 ml of benzene was added to 1 liter of a solution of 20% phosgene in benzene and the mixture was refluxed for 4 hours while bubbling phosgene therethrough. The benzene was then evaporated under reduced pressure and the residue was rectified to obtain 44 g of p-isopropyl-phenyl isocyanate boiling at 103°C at 15 mm Hg.

Step B: N-methoxy-N'-(4-isopropylphenyl)-urea

A solution of 13.6 g of O-methylhydroxylamine in 60 ml of isopropyl ether was added to a solution of 44 g of p-isopropyl-phenyl isocyanate in 450 ml of isopropyl ether and the mixture was stirred for 16 hours at room temperature. The precipitate was recovered by vacuum filtration to obtain 50 g of N-methoxy-N'-(4-isopropylphenyl)-urea melting at 120°C.

Step C: 1-(4'-isopropyl-phenyl)-3-methoxy-2-imidazolidone

A mixture of 40 g of N-methoxy-N'-(4-isopropylphenyl) -urea, 400 ml of dimethylsulfoxide, 200 g of potassium carbonate and 40 g of 1,2-dichloroethane was stirred for 16 hours at room temperature and the mixture was poured with stirring into 2 liters of a ice-water mixture. The precipitate formed was recovered by vacuum filtration, was dried and crystallized from isopropyl ether to obtain 25 g of 1-(4'-isopropyl-phenyl)-3-methoxy-2-imidazolidone melting at 68°–69°C.

Analysis: $C_{13}H_{18}N_2O_2$: molecular weight = 234.29: Calculated: %C, 66.64; %H, 7.74; %N, 11.96. Found: %C, 66.5; %H, 7.8; %N, 11.9.

EXAMPLE 12

Using the procedure of Examples 1, 2, 3, 4, 10 or 11 the starting ureas of Table 1, prepared by reacting phosgene with the appropriate amine and the reacting the appropriate isocyanate, were reacted to form the final products listed in Table 1 with their melting points.

TABLE 1

| Starting Product | Final Product | Melting point in °C |
|---|---|---|
| F–C₆H₄–NH–C(=O)–N(OCH₃)(H) | F–C₆H₄–N[imidazolidone]N–OCH₃ | 83–4 |
| Cl–C₆H₄–NH–C(=O)–N(OCH₃)(H) | Cl–C₆H₄–N[imidazolidone]N–OCH₃ | 112 |
| H₃C–C₆H₄–NH–C(=O)–N(OCH₃)(H) | H₃C–C₆H₄–N[imidazolidone]N–OCH₃ | 91 |
| H₃C–C(=O)–C₆H₄–NH–C(=O)–N(OCH₃)(H) | H₃C–C(=O)–C₆H₄–N[imidazolidone]N–OCH₃ | 158–9 |
| 2,3-Cl₂–C₆H₃–NH–C(=O)–N(OCH₃)(H) | 2,3-Cl₂–C₆H₃–N[imidazolidone]N–OCH₃ | 99 |
| 2,6-(CH₃)₂–C₆H₃–NH–C(=O)–N(OCH₃)(H) | 2,6-(CH₃)₂–C₆H₃–N[imidazolidone]N–OCH₃ | 170 |
| 3-Cl-4-H₃CO–C₆H₃–NH–C(=O)–N(OCH₃)(H) | 3-Cl-4-H₃CO–C₆H₃–N[imidazolidone]N–OCH₃ | 121 |
| 3,4-Cl₂–C₆H₃–NH–C(=O)–N(OC₂H₅)(H) | 3,4-Cl₂–C₆H₃–N[imidazolidone]N–OC₂H₅ | 91 |
| 3,4-Cl₂–C₆H₃–NH–C(=O)–N(OCH₃)(H) | 3,4-Cl₂–C₆H₃–N[imidazolidone]N–OCH₃ | 123 |
| 3-Cl–C₆H₄–NH–C(=O)–N(OCH₃)(H) | 3-Cl–C₆H₄–N[imidazolidone]N–OCH₃ | 60 |

TABLE 1 – Continued

| Starting Product | Final Product | Melting point in °C |
|---|---|---|
| 3-Cl, 4-CH₃ phenyl NH-C(=O)-N(OCH₃)H | 3-Cl, 4-CH₃ phenyl imidazolidinone-N-OCH₃ | 106 |
| 3,5-diCl phenyl NH-C(=O)-N(OCH₃)H | 3,5-diCl phenyl imidazolidinone-N-OCH₃ | 118 |
| phenyl NH-C(=O)-N(OCH₃)H | phenyl imidazolidinone-N-OCH₃ | 80 |
| 2,4-diCl phenyl NH-C(=O)-N(OCH₃)H | 2,4-diCl phenyl imidazolidinone-N-OCH₃ | 73 |
| 4-CH₃O phenyl NH-C(=O)-N(OCH₃)H | 4-CH₃O phenyl imidazolidinone-N-OCH₃ | 114 |
| 4-O₂N phenyl NH-C(=O)-N(OCH₃)H | 4-O₂N phenyl imidazolidinone-N-OCH₃ | 182 |
| 3,4-diCl phenyl NH-C(=O)-N(OCH₃)H | 3,4-diCl phenyl imidazolidinone-N-OCH₃ (CH₃ substituted) | 94 |

HERBICIDAL TESTS

The pre- and post-emergence herbicidal activity was determined for 1-(3',4', -dichlorophenyl)2-oxo-3-methoxy-hexahydropyrimidine (compound A), 1-(3',4'-dichlorophenyl)-3-methoxy-2-imidazolidone (compound B) and 1-(4'-isopropyl-phenyl)-3-methoxy-2-imidazolidone (compound C).

The test plants were cultivated in double bottom culture flats (23 × 14 × 4 cm) with watering from below. The different species were planted with 20 seeds for each species in rows spaced 3 cm apart in a single flat. Four tests were used for each connection and the growing conditions were as follows: 20° ± 2°C temperature, about 60% humidity, lighting by fluorescent tubes (daylight + brillant white) 6 to 22 hours each day. The dirt mixture used was 10 parts by volume of pure dirt, 10 parts by volume of river sand and 2 parts by volume of peat.

In the pre-emergence test, treatment was effected 24 hours after seeding after first bottom wetting by aspersion so as to facilitate penetration of the product into the bottom. In the post-emergence test, treatment was effected 21 days after the seeding with above ground growth.

In both cases, the tested products were applied under standard conditions with a microsprayer at doses ranging from 5 to 0.625 Kg/ha and a dilution corresponding to 560 liter per ha. In each test, there were controls which received no treatment and the final control was effected by the weight of the plants 15 days after treatment in the post-emergence test and 21 days after treatment in the pre-emgergence test. The results of the following tables are expressed in percentage of reduction of vegetation P as follows $$P = \frac{\text{weight of control plants} - \text{weight of treated plants}}{\text{weight of control plants}} \times 100$$

Table 2

| Dose in Kg/ha | Bent Grass | Oats | Wheat | Corn | Barley | Pre-emergence Test Compound A Rye Grass | Vulpin | Beets | Cheno-pode | Chrysan-themum | Mustard | Rumex | Clover |
|---|---|---|---|---|---|---|---|---|---|---|---|---|---|
| 5.0 | 100 | 23 | 0 | 0 | 32 | 74 | 59 | 100 | 100 | 100 | 100 | 100 | 100 |
| 2.5 | 100 | 0 | 0 | 0 | 0 | 73 | 60 | 100 | 100 | 100 | 100 | 100 | 100 |
| 1.25 | 100 | 0 | 0 | 0 | 0 | 34 | 38 | 29 | 61 | 87 | 82 | 44 | 82 |
| 0.625 | 73 | 0 | 0 | 0 | 0 | 39 | 43 | 26 | 52 | 100 | 100 | 31 | 75 |

Table 3

Pre-emergence Test
Compound B

| Doses in Kg/ha | Oats | Wheat | Corn | Vulpin | Beets | Chrysanthemum | Flax | Mustard | Clover |
|---|---|---|---|---|---|---|---|---|---|
| 5.0 | 54 | 0 | 0 | 42 | 100 | 100 | 80 | 100 | 100 |
| 2.5 | 20 | 0 | 0 | 40 | 100 | 100 | 60 | 100 | 100 |
| 1.25 | 0 | 0 | 0 | 9 | 100 | 100 | 26 | 100 | 100 |
| 0.62 | 0 | 0 | 0 | 0 | 93 | 82 | 13 | 100 | 100 |

Table 4

Post-emergence Test
Compound B

| Species | 2.5 Kg/ha | 1.25 Kg/ha |
|---|---|---|
| *Dicotyledons Crops* | | |
| Carrots | 0 | 0 |
| Cotton | 10 | 5 |
| Beans | 0 | 0 |
| Lentil | 25 | 0 |
| Leeks | 74 | 12 |
| Peas | 0 | 0 |
| Soy bean | 20 | 5 |
| Turnsol | 7 | 3 |
| Parsley | 32 | 17 |
| *Dicotyledon Weeds* | | |
| Amaranth | 100 | 100 |
| Chenopode | 100 | 100 |
| Laiteron | 100 | 100 |
| Matricaria | 100 | 100 |
| Rumex | 100 | 100 |
| Groundsel | 32 | 45 |

Table 5

Post-Emergence Test
Compound B

| Species | 2.5 Kg/ha | 1.25 Kg/ha |
|---|---|---|
| *Grass Crops* | | |
| Spring Wheat | 34 | 12 |
| Corn | 0 | 0 |
| Spring Barley | 0 | 0 |
| Rice | 0 | 0 |
| Rye | 10 | 2 |
| Sorghum | 47 | 25 |
| *Grass Weeds* | | |
| Cynodon dactylon | 95 | 80 |
| Common Meadow Grass | 60 | 0 |
| English Rye Grass | 60 | 50 |
| Hybrid Rye Grass | 75 | 10 |
| Stiff Rye Grass | 70 | 37 |

Table 6

Pre-Emergence Test
Compound C

| Dose in Kg/ha | Bent Grass | Oats | Wheat | Corn | Barley | Rye Grass | Vulpin | Beets | Chenopode | Chrysanthemum | Mustard | Rumex | Clover |
|---|---|---|---|---|---|---|---|---|---|---|---|---|---|
| 5.0 | 73 | 48 | 0 | 0 | 0 | 70 | 77 | 100 | 100 | 100 | 99 | 100 | 100 |
| 2.5 | 0 | 22 | 0 | 0 | 0 | 42 | 42 | 93 | 100 | 100 | 86 | 98 | 100 |
| 1.25 | 0 | 0 | 0 | 0 | 0 | 0 | 39 | 72 | 88 | 91 | 54 | 89 | 97 |
| 0.625 | 0 | 0 | 0 | 0 | 0 | 0 | 0 | 75 | 73 | 66 | 0 | 72 | 85 |

In the pre-emergence tests, compounds A and B possess a good pre-emergence herbicidal activity and are selective against grasses with little or no action. In the post-mergence test, compound B destroyed dicotyledonous weeds while leaving intact numerous dicotyledonous crops.

Table 7

Post-Emergence Test
Compound C

| Species | 5 Kg/ha |
|---|---|
| Oats | 94 |
| Bent Grass | 89 |
| Rye Grass | .59 |
| Chrysanthemum | 83 |
| Clover | 94 |
| Mustard | 100 |

Tables 6 and 7 show that compound C has a good pre-emergence herbicidal activity and shows a selectivity against grasses. In the post-emergence test, compound C shows an equally good herbicidal activity.

Various modifications of the products and process of the invention may be made without departing from the spirit or scope thereof and it is to be understood that the invention is to be limited only as defined in the appended claims.

We claim:

1. A compound of the formula

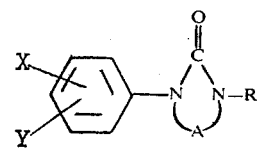

wherein A is ethylene, X is selected from the group consisting of hydrogen, halogen, —$CF_3$, —$NO_2$, acetyl, alkyl and alkoxy of 1 to 6 carbon atoms and alkenyloxy of 2 to 6 carbon atoms optionally substituted with halogen, Y is selected from the group consisting of hydrogen, halogen and alkyl and alkoxy of 1 to 6 carbon atoms and R is selected from the group consisting of alkoxy of 1 to 4 carbon atoms and alkoxycarbonyl of 2 to 6 carbon atoms.

2. A compound of claim 1 which is 1-(3',4'-dichlorophenyl)-3-methoxy-2-imidazolidone.

3. A compound of claim 1 which is 1-(4'-isopropylphenyl-3-methoxy-2-imidazolidone.

4. A compound of claim 1 which is 1-(3'-chlorophenyl)-3-methoxy-2-imidazolidone.

5. A compound of claim 1 which is 1-(3',6'-dichlorophenyl)-3-methoxy-2-imidazolidone.

* * * * *